T. W. ECCLESTON.
HOSE-COUPLINGS.
No. 193,810.  Patented Aug. 7, 1877.
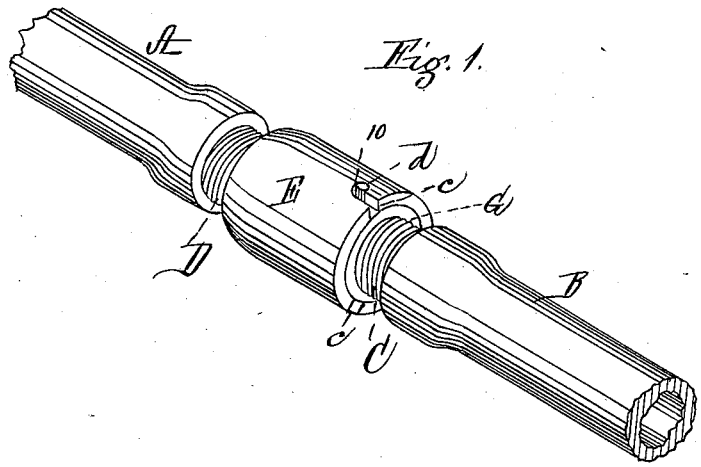
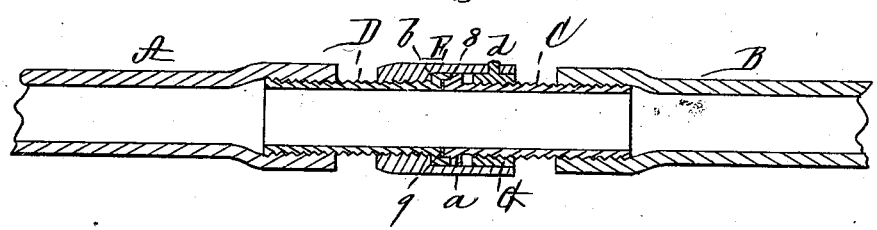
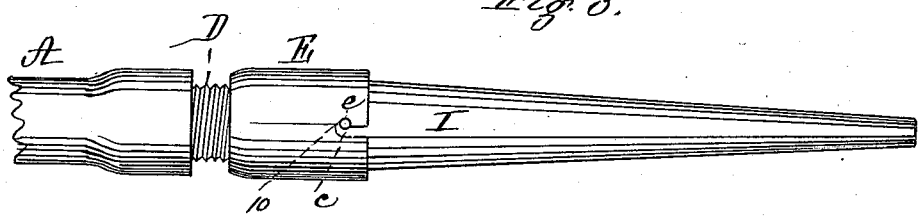
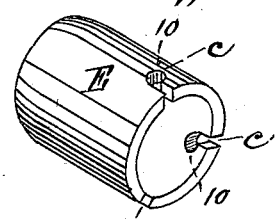
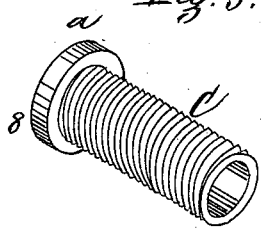
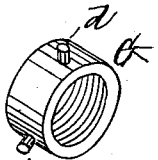
Inventor,
Thomas W. Eccleston,
Teschemacher & Stearns
Attorneys.
Witnesses,
W. J. Cambridge,
Chas. E. Griffin.

UNITED STATES PATENT OFFICE.

THOMAS W. ECCLESTON, OF BOSTON, MASSACHUSETTS.

IMPROVEMENT IN HOSE-COUPLINGS.

Specification forming part of Letters Patent No. 193,810, dated August 7, 1877; application filed June 30, 1877.

*To all whom it may concern:*

Be it known that I, THOMAS W. ECCLESTON, of Boston, in the county of Suffolk and State of Massachusetts, have invented certain Improvements in Hose-Couplings, of which the following is a full, clear, and exact description, reference being had to the accompanying drawings, making part of this specification, in which—

Figure 1 is a perspective view, representing two pieces of hose-pipe connected by my improved coupling. Fig. 2 is a longitudinal section through the center of the same. Fig. 3 represents a nozzle connected with a hose by my improved coupling. Figs. 4, 5, and 6 represent the several portions of my coupling detached.

To provide a coupling for readily connecting the ends of hose together in such manner as to secure a tight and reliable joint is the object of my invention, which consists in a coupling in which the two portions which are attached to the two pieces of hose are brought tightly together by turning a screw-sleeve fitting over them, one of the portions of the coupling which is attached to one piece of hose being provided with a screw-thread, which engages with a corresponding thread formed within the adjacent end of the sleeve, the other portion of the coupling attached to the other piece of the hose being also provided with a screw-thread, over which turns a collar provided with pins or projections adapted to enter slots of peculiar shape in the adjacent end of the screw-sleeve, by which the two portions of the coupling are united, the turning of the screw-sleeve serving to draw together the two portions of the coupling, (provided with right-and-left hand-screws,) so as to form a tight and reliable joint.

To enable others skilled in the art to understand and use my invention, I will proceed to describe the manner in which I have carried it out.

In the said drawings, A B represent the ends of two pieces of hose, to which are attached securely, in any suitable manner, the two portions C D of the coupling, one of these portions, C, being provided with a right-hand screw-thread, and the other, D, with a left-hand thread, the portion C being provided with a head, a, having a flange, 8, which is adapted to fit into a socket, 9, in the head b of the portion D, a washer being employed, if desired, to form a tight joint.

E is a sleeve, the interior of one end of which is provided with a screw-thread, and turns over the left-hand thread of the portion D of the coupling, the other end of the sleeve being provided with slots c, of the form seen, for the reception of pins d, projecting from a collar, G, which turns on the right-hand thread of the portion C of the coupling, and thus, after the collar G has been introduced within the adjacent end of the sleeve E, which causes the pins d to enter the slots c, it is simply necessary to turn the sleeve in the proper way, which draws the heads a b of the portions C D tightly together to form a tight joint, the direction in which the sleeve is turned causing the pins d to enter the portions 10 of the slots c, whereby the collar G is locked firmly to the sleeve E.

It will be seen that no twisting and turning of the hose is necessary where my improved coupling is employed.

I is a nozzle, the butt-end of which is provided with pins e, which enter the slots c in the sleeve E, and is locked by turning the latter in the proper direction, which causes the head of the portion D to be brought up snugly against the butt-end of the nozzle to form a tight joint. (See Fig. 3.)

It is evident that my improved coupling may be employed in connecting metallic as well as flexible pipe or hose without departing from the spirit of my invention.

What I claim as my invention, and desire to secure by Letters Patent, is—

The combination of the screw portion C, with its collar G, provided with pins d, the screw portion D, and the screw-sleeve E, with its slots c, constructed to operate substantially as and for the purpose described.

Witness my hand this 25th day of June, 1877.

THOMAS W. ECCLESTON.

In presence of—
  N. W. STEARNS,
  W. J. CAMBRIDGE.